(12) United States Patent (10) Patent No.: US 8,159,959 B2
Ohlfs et al. (45) Date of Patent: Apr. 17, 2012

(54) GRAPHIC USER INTERFACE FOR PLAYING VIDEO DATA

(75) Inventors: Keith R. Ohlfs, Redwood City, CA (US); Prasanna Ganesan, Menlo Park, CA (US)

(73) Assignee: VUDU, Inc., Santa Clara, CA (US)

( * ) Notice: Subject to any disclaimer, the term of this patent is extended or adjusted under 35 U.S.C. 154(b) by 1513 days.

(21) Appl. No.: 11/383,749

(22) Filed: May 16, 2006

(65) Prior Publication Data

US 2009/0019476 A1    Jan. 15, 2009

Related U.S. Application Data

(63) Continuation-in-part of application No. 11/269,462, filed on Nov. 7, 2005, now abandoned.

(51) Int. Cl.
*H04L 12/26* (2006.01)
*G06F 15/16* (2006.01)
*G06F 3/00* (2006.01)

(52) U.S. Cl. .......................... 370/252; 709/231; 715/719

(58) Field of Classification Search .................. 709/231; 725/39; 370/252; 715/719
See application file for complete search history.

(56) References Cited

U.S. PATENT DOCUMENTS

| | | | |
|---|---|---|---|
| 5,530,754 A | 6/1996 | Garfinkle | |
| 5,798,785 A | 8/1998 | Hendricks et al. | |
| 5,812,123 A | 9/1998 | Rowe et al. | |
| 5,831,662 A | 11/1998 | Payton | |
| 5,838,314 A | 11/1998 | Neel et al. | |
| 5,886,730 A | 3/1999 | Tsosie | |
| 6,005,565 A | 12/1999 | Legall et al. | |
| 6,065,050 A * | 5/2000 | DeMoney | 709/219 |
| 6,097,878 A * | 8/2000 | Saib | 386/297 |
| 6,134,547 A * | 10/2000 | Huxley et al. | 1/1 |
| 6,177,931 B1 | 1/2001 | Alexander et al. | |
| 6,247,043 B1 | 6/2001 | Bates et al. | |
| 6,285,987 B1 | 9/2001 | Roth et al. | |
| 6,363,939 B1 | 4/2002 | Wilk | |
| 6,515,680 B1 | 2/2003 | Hendricks et al. | |
| 6,564,213 B1 | 5/2003 | Ortega et al. | |
| 6,622,148 B1 | 9/2003 | Noble et al. | |
| 6,668,377 B1 * | 12/2003 | Dunn | 725/92 |
| 6,754,715 B1 * | 6/2004 | Cannon et al. | 709/231 |
| 7,010,616 B2 | 3/2006 | Carlson et al. | |
| 7,024,679 B1 | 4/2006 | Sie et al. | |
| 7,281,261 B2 | 10/2007 | Jaff et al. | |
| 7,293,275 B1 * | 11/2007 | Krieger et al. | 725/40 |

(Continued)

OTHER PUBLICATIONS 8 1/2 movie poster. 1963. Accessed Mar. 27, 2010. http://www.filmposters.com/movie-poster.asp? ProdID-12032.

(Continued)

*Primary Examiner* — Faruk Hamza
*Assistant Examiner* — Benjamin Ailes
(74) *Attorney, Agent, or Firm* — Mahamedi Paradice Kreisman LLP

(57) ABSTRACT

A graphic user interface is provided to facilitate a playback of a movie from any desired point. The graphic user interface includes a track bar to reflect how much time data pertaining to the movie title is available for playback. After it is determined that a current data point is being dragged along the track bar, a time corresponding to the current data point is tracked as such a subsequent playback of the movie starts right from the current data point. In one embodiment, dragging the current data point along the track bar is achieved by a scroll wheel.

18 Claims, 12 Drawing Sheets

U.S. PATENT DOCUMENTS

| | | | |
|---|---|---|---|
| 7,392,326 B2 | 6/2008 | Vale | |
| 7,577,921 B2 | 8/2009 | Zink | |
| 7,945,694 B2 * | 5/2011 | Luzzatti et al. | 709/234 |
| 2001/0013126 A1 | 8/2001 | Lemmons et al. | |
| 2002/0124256 A1 | 9/2002 | Suzuka | |
| 2003/0046276 A1 | 3/2003 | Gutierrez et al. | |
| 2003/0046698 A1 | 3/2003 | Kamen et al. | |
| 2003/0115597 A1 | 6/2003 | Yassin et al. | |
| 2003/0221192 A1 | 11/2003 | Rappaport et al. | |
| 2003/0236906 A1 * | 12/2003 | Klemets et al. | 709/231 |
| 2004/0027371 A1 * | 2/2004 | Jaeger | 345/716 |
| 2004/0117831 A1 | 6/2004 | Ellis et al. | |
| 2004/0130975 A1 | 7/2004 | Kii et al. | |
| 2004/0216160 A1 | 10/2004 | Lemmons et al. | |
| 2004/0267952 A1 * | 12/2004 | He et al. | 709/231 |
| 2005/0005241 A1 | 1/2005 | Hunleth et al. | |
| 2005/0076363 A1 | 4/2005 | Dukes et al. | |
| 2005/0216839 A1 * | 9/2005 | Salvucci | 715/723 |
| 2005/0283468 A1 | 12/2005 | Kamvar et al. | |
| 2005/0289106 A1 | 12/2005 | Petri et al. | |
| 2005/0289593 A1 | 12/2005 | Spilo | |
| 2006/0026635 A1 | 2/2006 | Potrebic et al. | |
| 2006/0026639 A1 | 2/2006 | Potrebic et al. | |
| 2006/0037037 A1 | 2/2006 | Miranz | |
| 2006/0059426 A1 * | 3/2006 | Ogikubo | 715/723 |
| 2006/0146436 A1 | 7/2006 | Goodwin et al. | |
| 2006/0168298 A1 * | 7/2006 | Aoki et al. | 709/231 |
| 2006/0206454 A1 | 9/2006 | Forstall et al. | |
| 2006/0218088 A1 | 9/2006 | Flora et al. | |
| 2006/0230331 A1 | 10/2006 | Abanami et al. | |
| 2006/0242681 A1 | 10/2006 | Brain et al. | |
| 2006/0248078 A1 | 11/2006 | Gross et al. | |
| 2007/0162611 A1 * | 7/2007 | Yu et al. | 709/232 |
| 2008/0126996 A1 | 5/2008 | Morris et al. | |
| 2009/0013350 A1 | 1/2009 | Ohlfs et al. | |
| 2009/0024602 A1 | 1/2009 | Ohlfs | |
| 2009/0024603 A1 | 1/2009 | Zink | |

OTHER PUBLICATIONS

Bondmovies.com Banner Gallery. Archived Oct. 13, 2004. http://web.archive.org/web/20041013030048/http:/bondmovies.com/bannergallery.

Final Office Action dated Feb. 1, 2011 in U.S. Appl. No. 11/363,751; 16 pgs.

Final Office Action dated Mar. 31, 2010 for U.S. Appl. No. 11/203,021, 15 Pages.

Final Office Action dated May 29, 2009 for U.S. Appl. No. 11/383,751, 16 Pages.

Movie Manual; Bitz & Pixelz BV; copyright © 2000-2008; http://downloads.collectorz.com/manuals/movie_manual_en.pdf, 174 pages.

Non-Final Office Action dated Aug. 20, 2010 for U.S. Appl. No. 11/383,751, 15 pages.

Non-Final Office Action dated Oct. 14, 2010 for U.S. Appl. No. 11/203,021, 15 pages.

Non-Final Office Action dated Jul. 31, 2009 in U.S. Appl. No. 11/203,021 15 pgs.

Notice of Allowance dated Apr. 17, 2009 in 2009/0024603A1, 9 pages.

Rush_Hour_2_Movie_Poster.pdf, http://www.imdb.com/media/rm417176576/tt0266915; printed Jul. 2, 2008.

Web page including "From Russia with_Love" movie poster. httpP//www.solarnavigator.net/films_movies_actors/films/from_russia/with_love.htm; printed Oct. 9, 2010.

"8 1/2" movie poster. 1963. Accessed Mar. 27, 2010. http://www.filmposters.com/movie-poster.asp? ProdID-12032.

Web page including "From Russia with_Love" movie poster. httpP//www.solarnavigator.net/films_movies_actors/films/from_russia/with_love.htm.

U.S. Appl. No. 11/679,180, filed Feb. 26, 2007, Ganesan et al.

Archived IMDB page: "Robert Redford" Jun. 22, 2004.

Final Office Action dated Jul. 6, 2011 in U.S. Appl. No. 11/203,021.

Final Office Action dated Dec. 30, 2008 in U.S. Appl. No. 11/203,021.

Final Office Action dated Dec. 9, 2008 in U.S. Appl. No. 11/458,385.

Supplemental Notice of Allowability dated May 29, 2009 in U.S. Appl. No. 11/458,385.

Google—2005—ScreenShot (Google Inc., Copyright 2005; http://web.archive.org/web/20060101175628/www.google.com/, 3 pages).

Non-Final Office Action dated Jun. 25, 2008 in U.S. Appl. No. 11/458,385, 9 pgs.

Non-Final Office Action dated Oct. 7, 2008 in U.S. Appl. No. 11/383,751, 8 pgs.

Non-Final Office Action dated Jul. 9, 2008 in U.S. Appl. No. 11/226,625, 19 pgs.

Non-Final Office Action dated Jun. 26, 2008 in U.S. Appl. No. 11/203,021, 15 pgs.

* cited by examiner

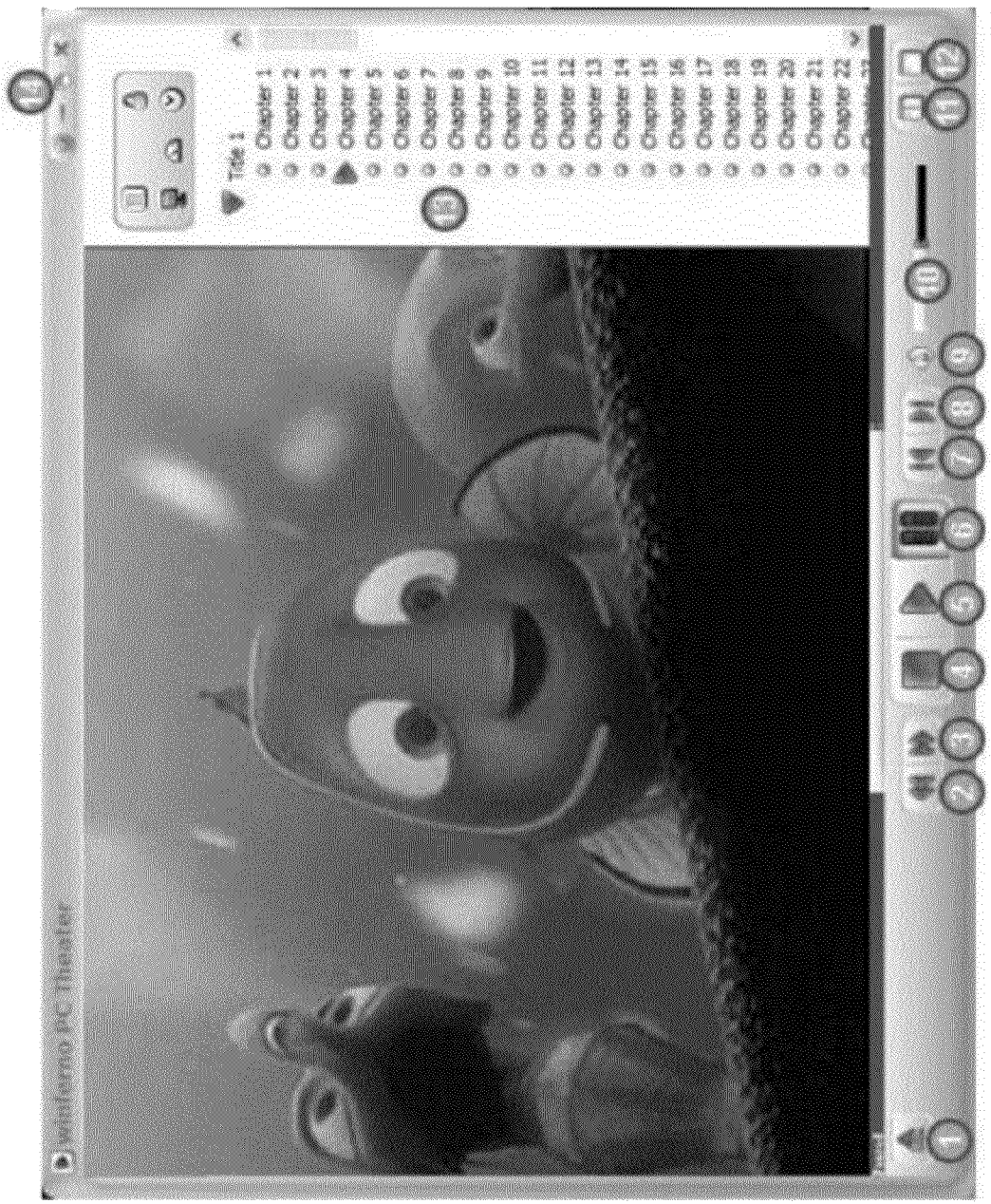
PRIOR ART FIG. 1

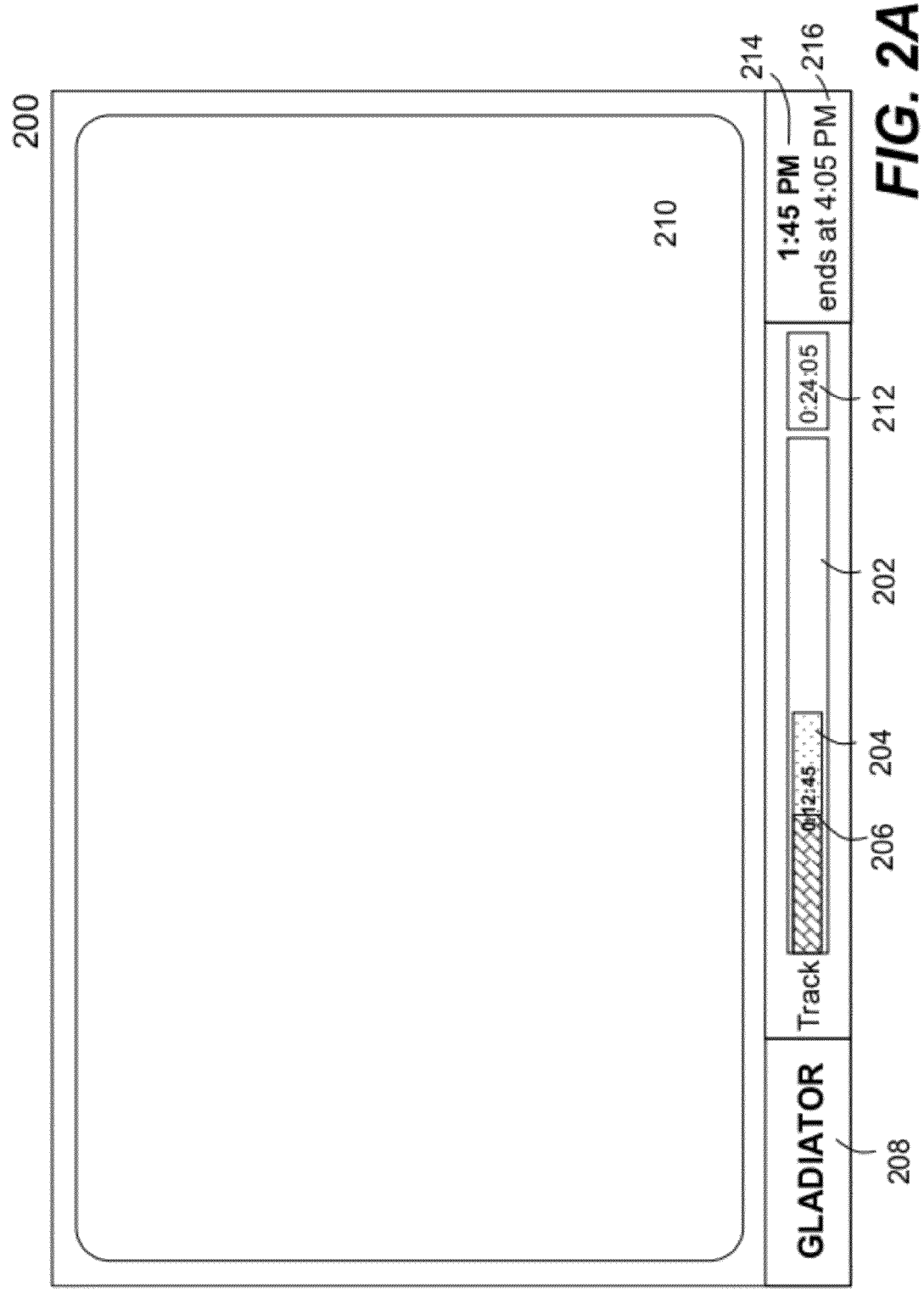

GRAPHIC USER INTERFACE FOR PLAYING VIDEO DATA

CROSS-REFERENCE TO RELATED APPLICATION

This is a continuation-in-part of U.S. application Ser. No. 11/269,462, entitled "Hybrid architecture for media services" and filed Nov. 7, 2005 now abandoned, and by at least one of the co-inventors herein.

BACKGROUND

1. Technical Field

The present invention relates generally to the display of information on display screens. More particularly, the present invention relates to techniques for playing back video data in a manner that both fast forwarding and rewinding are not linearly performed, a user may start from any point of the view by dragging a starting point in a track bar. In addition, the present invention also relates to techniques for search a video library including many titles by genre.

2. Description of the Related Art

Both VCR and DVD players are equipped with functions for fast forwarding and rewinding. The functions for fast forwarding and rewinding are to allow viewers to simply start from a preferable point. However, a VCR player performs the functions slowly because of the limitation in reading the magnetic tapes and the fact that tapes can only be scanned sequentially. A DVD player allows a user to set up a speed (e.g., 2×, 4×, 8× and 20×) for performing fast forwarding and rewinding. In either case, a user has to be patient enough to go through portions of the video that otherwise should be skipped before reaching a desired point.

DVD players also come as software applications that typically run in a computing device with a display screen and a DVD drive. FIG. 1 shows an example of a DVD player playing back a movie. As labeled in the figure, "Eject" button is used to eject a DVD. "Rewind" is provided to rewind a DVD. When "Rewind" button is pressed, a user sees that the movie is played back in reverse at a predefined speed (e.g., 2×, 4×, 8×, or 20×). "Fast Forward" is provided to fast forward through a DVD. When "Fast Forward" button is pressed, a user sees that the movie is played back at a predefined speed (e.g., 2×, 4×, 8×, or 20×). "Stop" is provided to stop a DVD while "Play" is to play a DVD and wait for the movie from the DVD to be loaded. "Pause" is provided to pause a DVD in playback mode. In either case of "Rewind" and "Fast Forward", a user has to be patient enough to go through those that otherwise should be skipped before reaching to a desired point.

In many cases, viewers prefer to quickly jump to desired points of a movie title to examine or enjoy sections of the movie. Accordingly there is a need for a mechanism that facilitates such a nonlinear playback of a movie title. Likewise, when there is a huge library of movies, there is also a need for an interface that facilitates a fast search of a desired title.

SUMMARY

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Broadly speaking, the present invention is related to techniques for graphic user interfaces. According to one aspect of the present invention, a graphic user interface is provided to facilitate a playback of a movie from any desired point. The graphic user interface includes a track bar to reflect how much time data pertaining to the movie title is available for playback. After it is determined that a current data point is being dragged along the track bar, a time corresponding to the current data point is tracked as such a subsequent playback of the movie starts right from the current data point. In one embodiment, dragging the current data point along the track bar is achieved by a scroll wheel.

According to still another aspect of the present invention, a graphic user interface is provided to allow a user to search an interested title among a plurality of titles by genre. In one embodiment, a list of types classifying the titles is displayed. A user is allowed to select one or more of the types to narrow down the list so that an interested title can be readily located in form of movie banners. In one embodiment, as types are being selected, the list is progressively reduced. When one of the selected types is relaxed, the list is increased. In any case, movie titles in the list fall into a category classified by either one or all of the selected types.

Other aspects of the invention will become apparent and appreciated by those skilled in the art from the detailed description herein. Embodiments of the invention may be implemented in numerous ways, including a method, system, device, or a computer readable medium. Several embodiments of the invention are discussed below. According to one embodiment, the invention is a device for displaying movies, the device comprises a memory for storing a software module, a display screen; a driver, a microprocessor, coupled to the memory, executing the software module such that the driver causes the driver to display a graphic user interface on the display screen after a movie title is selected. The graphic user interface includes a track bar to reflect how much time data pertaining to the movie title is available for playback. The software module is configured to perform operations of determining whether a current data point is being dragged along the track bar, tracking a time corresponding to the current data point once the current data point is dragged; and continuing to play back the movie title starting from the current data point.

There are many objects, features, and advantages of the present invention. These objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 1 shows an example of a DVD player playing back a movie;

FIG. 2A shows an exemplary graphic user interface providing a track bar that shows an available data length in which a current data point indicates where current data is being played;

DETAILED DESCRIPTION OF THE INVENTION

Figure 2B:
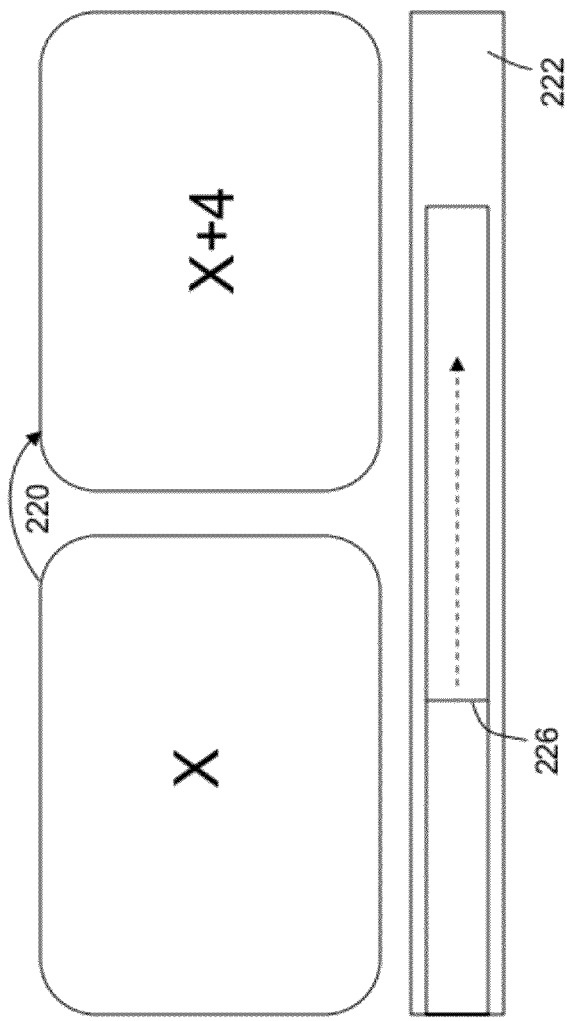
FIG. 2B shows that a current movie data point is slowly moved by the user along the track bar, but still faster than the normal playback speed, accordingly a display of the title may be shown as if the playback speed was speeded up (i.e., fast forward or rewind)

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments, if any, do not inherently indicate any particular order nor imply limitations in the invention.

Referring now to the drawings, in which like numerals refer to like parts throughout the several views. FIG. 2A shows an exemplary graphic user interface 200 providing a track bar 202 that shows an available data length 204 in which a current data point 206 indicates where current data is being played. Both the data length 204 and the current data point 206 are expressed in terms of time. In one embodiment, the available data length 204 occupies the entire the track bar 202 to indicate that the movie data for the title is all locally available. In another embodiment, as will be further explained below, the movie data is concurrently being downloaded from other devices on a network, the track bar 202 is partially occupied and progressively growing over the time to indicate that the movie data is being received as streaming while the title is being played back.

Figure 2C:
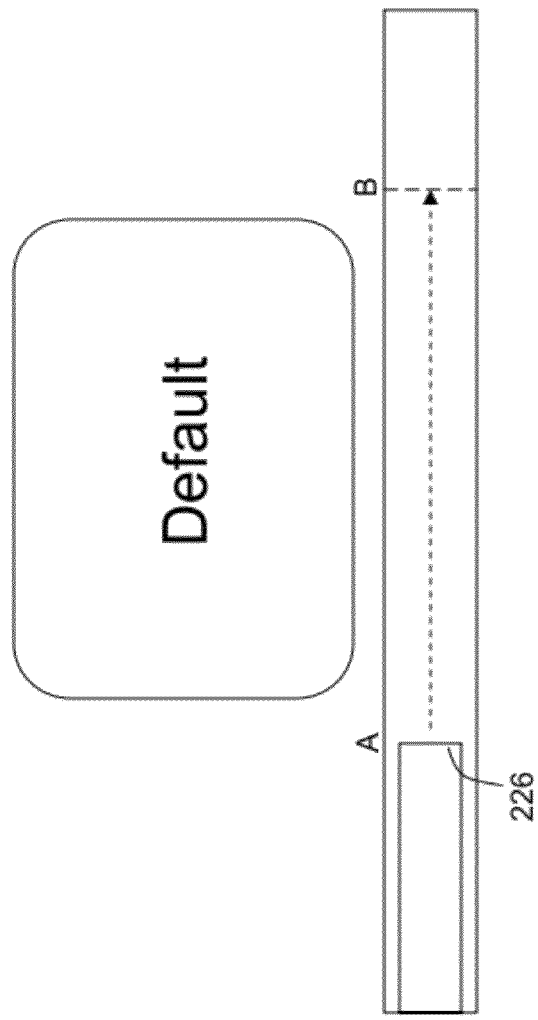
FIG. 2C shows that, If a current movie data point is moved nonlinearly or randomly by the user from point A to point B (e.g., one hour ahead in play time), a default image, such as a blue color display, is shown till point B is reached, then a full image closest to point B, is displayed.

Different from the prior art players, the graphic user interface 200 allows a user to manually drag the current data point 206 along the track bar 202 and may stop anywhere in the track bar 202. Operationally, in one embodiment, the current movie data point 206 would not be dragged beyond the available data length 204. Depending on the dragging speed and the underlying data format, the display 210 may show movie frames or a default display as the current movie data point 206 being dragged along in the track bar 202. As shown in FIG. 2B, as a current movie data point 226 is slowly moved by the user along the track bar 222, a display 220 of the title may be shown as if the playback speed was speeded up (i.e., fast forward or rewind). The speed at which the current movie data point 222 is moved may correspond to the speed at which the video is skipped forward or backward. For example, if the current movie data point is moved slowly, the video may skip every other frame in order to show a 2× speed-up. If the data point is moved faster, the video may skip many more intermediate frames in order to show a speed-up corresponding to the speed at which the data point is moved. If the current movie data point 206 is moved nonlinearly or randomly by the user to a point, as shown in FIG. 2C, from point A to point B (e.g., one hour ahead in play time), a sequence of intermediate images between A and B are shown until the data point reaches point B. If the data point moves so fast from A to B that there is very little time to show many intermediate images, a default image, such as a still picture of the video at point A is shown until the data point reaches point B. Once it reaches point B, a full image closest to point B, as will be further explained below, is displayed.

In operation, the current data point 206 may be dragged forward (to mimic a fast forward function) and backward (to mimic a rewind function). Different from the predefined playback speeds for either fast forward or rewind in a prior art system, the present invention does not require a user to set the playback speeds in fast forward or rewind, and instead allows the user to jump to any point to start or continue a playback. According to one embodiment, the movement of the current data point 206 is achieved by a scroll wheel (e.g., on a remote controller and a mouse). A user may drag the current movie data point 206 to any location in the track bar 202 by scrolling a scroll wheel. One of the advantages in the present invention is that the user does not have to wait and view all the intermediate scenes in a title and can reach a desired starting point rapidly.

Figure 3A:
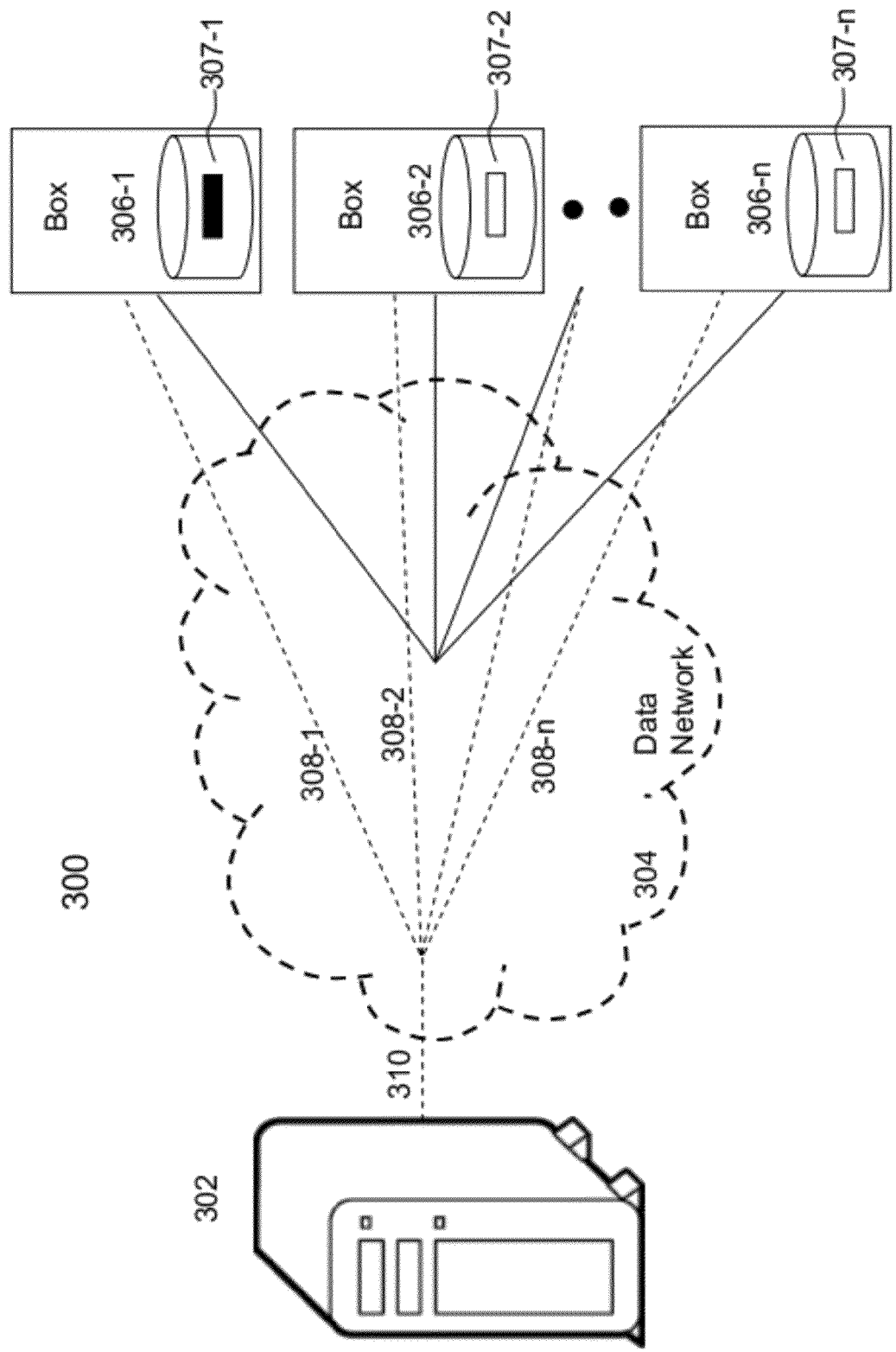
FIG. 3A shows an exemplary configuration of a distributed network system in which the present invention may be practiced.

The graphic user interface 200 also shows a movie title 208 being played, a total play time 212 for available data of the movie title 208, a current time 214 and at what time 216 the movie is supposed to end. To further understand the present invention, FIG. 3A shows an exemplary configuration of a distributed network system 300 in which the present invention may be practiced. A server 302, presumably managed and/or populated by a service provider, is configured to handle the delivery of video (or multimedia) services to users via local machines or boxes 306-1, 306-2, . . . 306-n. Different from the prior art system that delivers video data to a subscriber upon receiving a request therefrom, the server 302 is not responsible for delivering the content in response to a request from a user, and instead is configured to provide source information as to where and how to retrieve at least some of the content from other boxes. In other words, the prior art system requires at least a media storage device to provide the content when any of the client machines is being serviced, while the server 302 does not need necessarily a media storage device to provide the content. Instead, some of the boxes 306-1, 306-2, . . . 306-n are respectively configured to supply part or all of the content to each other.

According to one embodiment, when fulfilling a request from a local machine or a box 306-1, communication between the server 302 and the box 306-1 over the network paths 308-1 and 310 may be limited to small-scale requests and responses (e.g., of small size and very short). A server response to a request from a box may include source information (e.g., identifiers), authorization information and security information. Using the response from the server 302, the box 306-1 may be activated to begin playback of a title. Data representing the title may be distributed in other boxes. The data, as will be shown below, is segmented into a number of segments, each is distributed to some boxes in services. Substantially at the same time, the box 306-1 may initiate one or more requests to other boxes (e.g., 306-2 and 306-n) in accordance with the source identifiers to request the distributed segments (e.g., 307-2 and 307-n). Assuming proper authorization, the requesting box 306-1 receives the distributed segments concurrently from the other boxes.

The contents available in a library being offered in any of the boxes 306-1, 306-2, . . . 306-n are originally provided by one or more content providers. Examples of the content providers include satellite receivers, television relay stations, analog or digital broadcasting station, movie studios and Internet sites. Depending on implementation, the contents may be initially received or originated in the server 302. Instead of maintaining and managing the content in a large storage device, the server 302 is configured to distribute the content or files to a plurality of local machines registered with the server 302. The boxes 306-1, 306-2, . . . 306-n shown in FIG. 3A are examples of local machines in service. Unless there is a need for a backup copy, the server 302 at any time has no need to keep a copy of the content. On the other hand, unless there is a special need to keep a complete copy of an extremely high-demand title in a box, none of the boxes in service has a complete copy of a title until an order is placed.

Figure 3B:
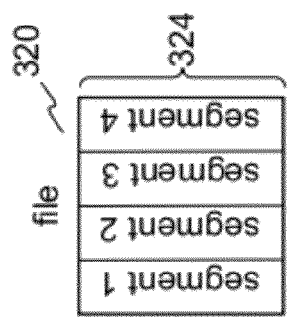
FIG. 3B shows an embodiment in which a file is being organized or fragmented in terms of four segments.
Figure 3C:
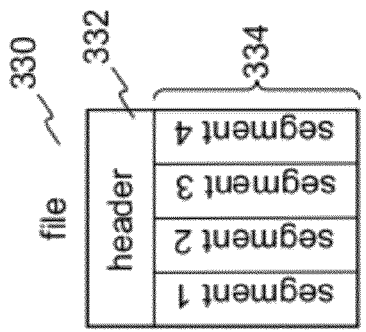
FIG. 3C shows another embodiment in which a file is being organized or fragmented in terms of a header and four segments, where the header is always locally cached.

Referring to FIG. 3B, there shows an embodiment in which a file 320 is being organized or fragmented in terms of four segments 324. In general, the file 320 representing a collection of all data pertaining to a title may be divided into any number of segments in consideration of a required transmission rate (e.g., related to the encoding and decoding rates for successful playback), and the minimum uploading and downloading capabilities of a network. FIG. 3C shows another embodiment in which a file 330 is being organized or fragmented in terms of a header 332 and four segments 334, where the header 332 is always locally cached. One of the advantages of having a header locally cached is to facilitate an instantaneous playback after a movie is order. While the header is being played back, the needed segments are retrieved from other designated boxes. It can be appreciated the length of a header may be predefined or dynamically determined to provide a time buffer (e.g., 5 minutes) sufficiently to retrieve part of the data from the distributed segments for assembling with that of any locally cached segments, if any. As a result, an instantaneous VOD system may be realized.

Figure 3D:
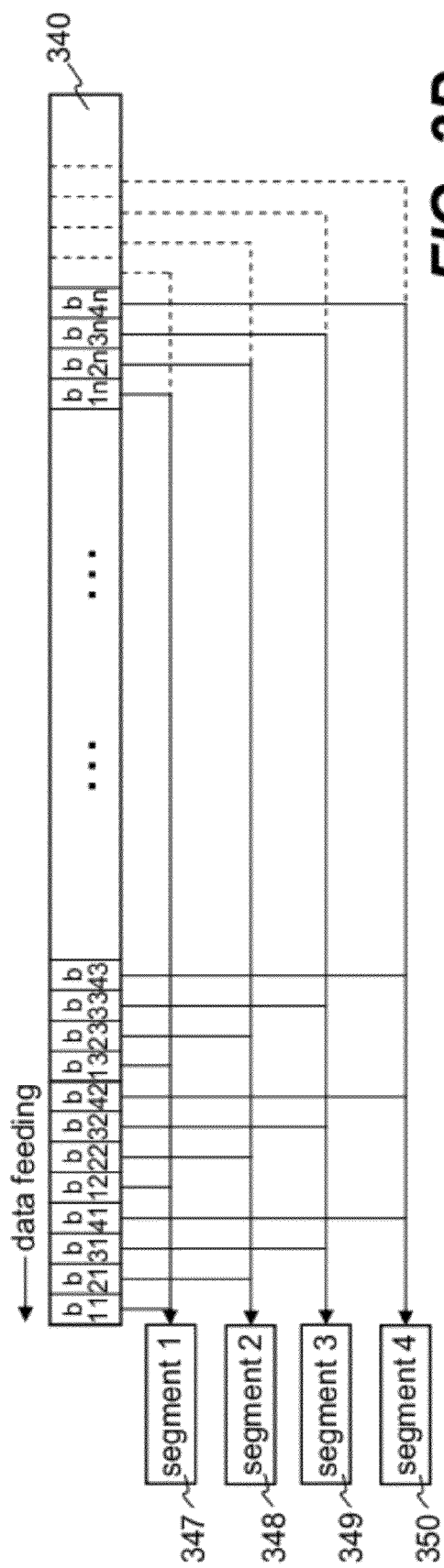
FIG. 3D shows that a data stream representing pertaining to a movie is being fragmented into four segments.

Regardless whether a header is used or not, a file or a majority of a file will be fragmented and the segments are distributed among the boxes in service. FIG. 3D shows a data stream 340 representing a file or a majority of a file. The file 340 is divided into four segments 347-350. The segments 347-350 are created or formed by respectively sampling the file in a decimated manner. As a result, each of the segments includes a plurality of data blocks. Depending on an exact data length of the file 340, an n-th data block in each of the segments 347-350 is four successive data blocks in the file. In one embodiment, a data block comprises a chunk of data, for example, 256 Kbytes or 1 Mbyte.

As shown in FIG. 3D, the data stream 340 is expressed in data blocks as follows: $b11$, $b21$, $b31$, $b41$, $b12$, $b22$, $b32$, $b42$, $b13$, $b23$, $b33$, $b43$, . . . $b1n$, $b2n$, $b3n$, $b4n$. With the decimated sampling, the four segments 347-350 obtained can be respectively expressed as follows:

Segment 1={$b11$, $b12$, $b13$, $b14$ . . . $b1n$};
Segment 2={$b21$, $b22$, $b23$, $b24$ . . . $b2n$};
Segment 3={$b31$, $b32$, $b33$, $b34$ . . . $b3n$}; and
Segment 4={$b41$, $b42$, $b43$, $b44$ . . . $b4n$}, where b stands for "data block", numerals after "b" are mere reference numbers. As used above, the data blocks $b11$, $b21$, $b31$, $b41$, $b12$, $b22$, $b32$, $b42$, $b13$, $b23$, $b33$, $b43$, . . . $b1n$, $b2n$, $b3n$, $b4n$ are sequential while, for example, data blocks $b11$, $b12$, $b13$, $b14$ . . . $b1n$ in Segment 1 are not sequential.

In other words, the data blocks in each of the segments are non-consecutive. Data streams from all segments must be multiplexed to reproduce useful data for playback.

Figure 4:
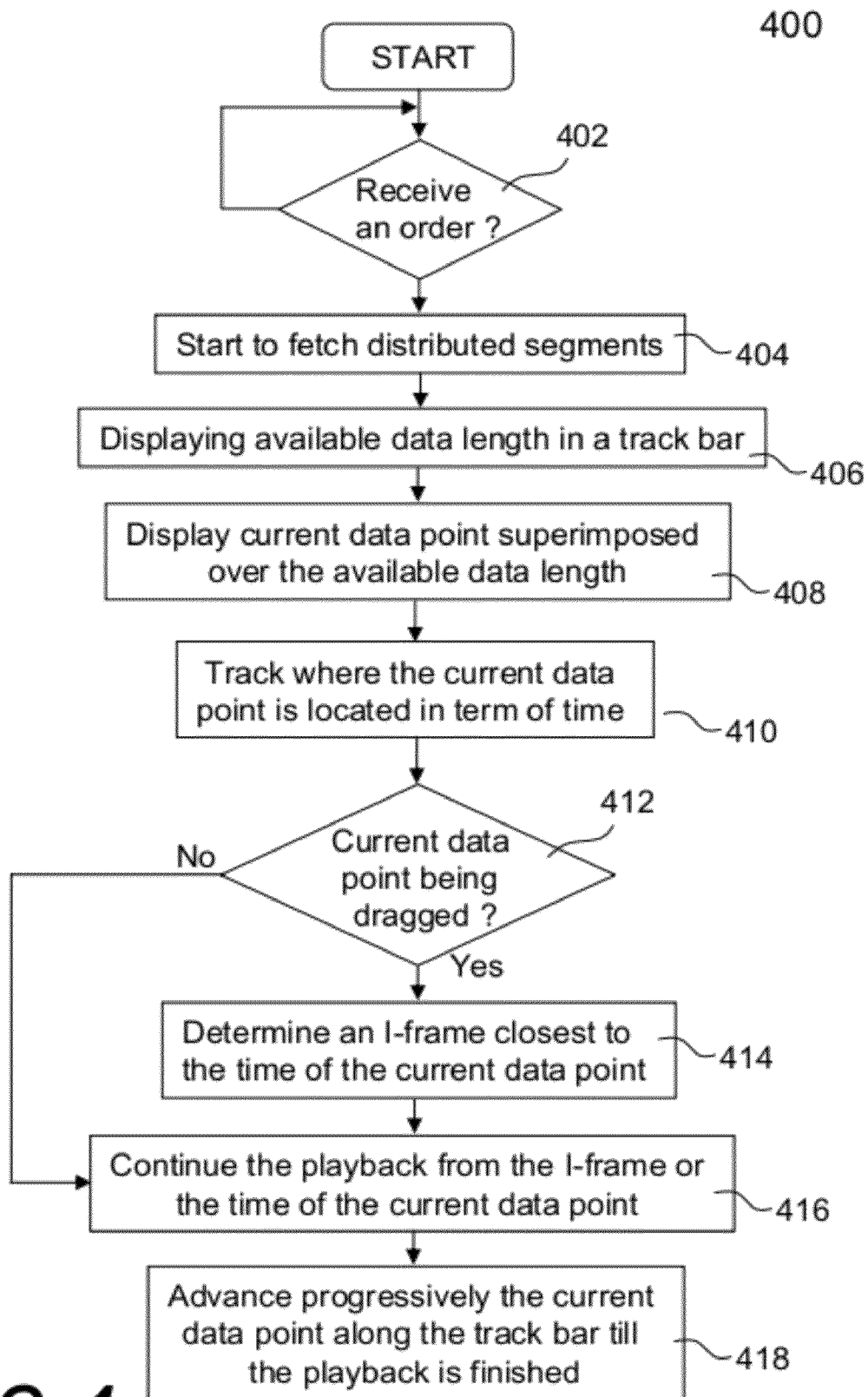
FIG. 4 shows a flowchart or process of providing a graphic user interface that allows a user to reach any desired starting point.

Referring now to FIG. 4, there shows a flowchart or process 400 of providing a graphic user interface that allows a user to reach any desired starting point. The process 400, in accordance with one embodiment, may be readily understood in conjunction with previous figures. Depending on implementation, the process 400 may be implemented in software, hardware or in combination of both as a method or a software module executing in an apparatus.

It is assumed that the process 400 is executed in a client machine or device coupled to a display screen. The device may include, but not be limited to, a set-top box, and a computing device and controlled by a remote control with a scroll wheel. The device is assumed to be coupled to a network (e.g., the Internet) and a user of the device is also assumed to have subscribed to video services with a service provider that operates a server.

Accordingly, at 402, the device awaits an order from the user. In operation, the device executes a software module that is configured to display a list of available titles or provide a search mechanism for the user to look for a desired title. It is assumed that a title is selected. The process 400 now goes to 404 where distributed segments for the selected title are started to be fetched or downloaded. In operation, a request from the device is transported to the server. The request includes information about the selected title as well as an identifier (e.g., an IP address) of the device. It is assumed that the user is authorized to access the service provided by the server, the server is configured to contact other selected devices that may locally cache those distributed segments. Typically, those that are physically close to the ordering device and have sufficient uploading bandwidth are preferably selected.

It is assumed that data for the selected file has been segmented into four segments, only one is locally cached in the ordering device, and other three segments are distributed in other devices. Thus three other devices are selected and contacted to supply the three distributed segments to the ordering device. At 404, the distributed segments are started to be fetched from the supplying devices. As the distributed data is concurrently coming, an available data length in terms of time is displayed in a track bar and progressively expanded so that the user knows when the selected title can be started. As shown in FIG. 2, once the available data length is shown, the selected title may be started. As the data being played, the current movie data point starts to be shown over the available data length at 408.

The exact time of the current data point is typically tracked at 410. As shown in FIG. 2A, the time of the current data point is also shown so that viewers know how much time the movie has been played. At 412, the process 400 determines whether the current movie data point is being dragged in the track bar (within the available data length). If the current movie data point is unchanged, the user is continuing the movie at the normal speed and sequence. If the current movie data point is changed, which means that the user has chosen a different starting point, the process 400 goes to 414 where an I-frame closest to the time of the current movie data point is determined.

It is well known in the art that there are three types of encoded frames in compressed video data, I or intra frames, P or predicted frames and B (bidirectional) frames. I frames are simply a frame coded as a still image. P frames are predicted from the most recently reconstructed I or P frame. The sequence of encoded frames usually appears like: . . . IBBPB-BIBBPBBIBBPBBIB . . . where IBBPBB forms a group of pictures (GOP), referred to as S(6, 3), meaning a GOP has 6 "frames" comprising a plurality of subGOP of 3 frames, e.g. IBB or PBB. In other words, this is based on a random access requirement that one needs a starting point at least once every 0.2 seconds or so. It is known there are S(12, 3), S(15, 4) and other GOPs depending on the compressing requirement and television video format in use.

One of the reasons of locating an I-frame or a first frame in a GOP closest to the time of the current data point is to ensure that a full image is available and subsequent play can be smoothly started from the full image. Once such frame is located in the available data length at 416, the playback starts from the current movie data point. At 418, the current movie data point is progressively advanced along the track bar that is also progressively advanced as the distributed data is concurrently being fetched.

A key advantage of this graphical user interface of FIGS. 2A, 2B and 2C (which offers no "Rewind" or "Fast-forward" buttons) is that it is possible to smoothly skip forward and backward through a video even if the GOP structure does not contain frequent I frames and even if B frames cannot be dropped. A typical implementation of a smooth fast-forward or rewind mechanism requires a constrained GOP structure (such as the requirement to have at least 2 I-frames each second), so that it is possible to drop some frames in the video, decode only the rest and still produce an acceptable display. The use of the skipping feature based on the user's movement of the movie data point eliminates the need for smooth playback at a constant speed, and makes it possible to enable skipping even in video streams with very infrequent I-frames.

Figure 5A:
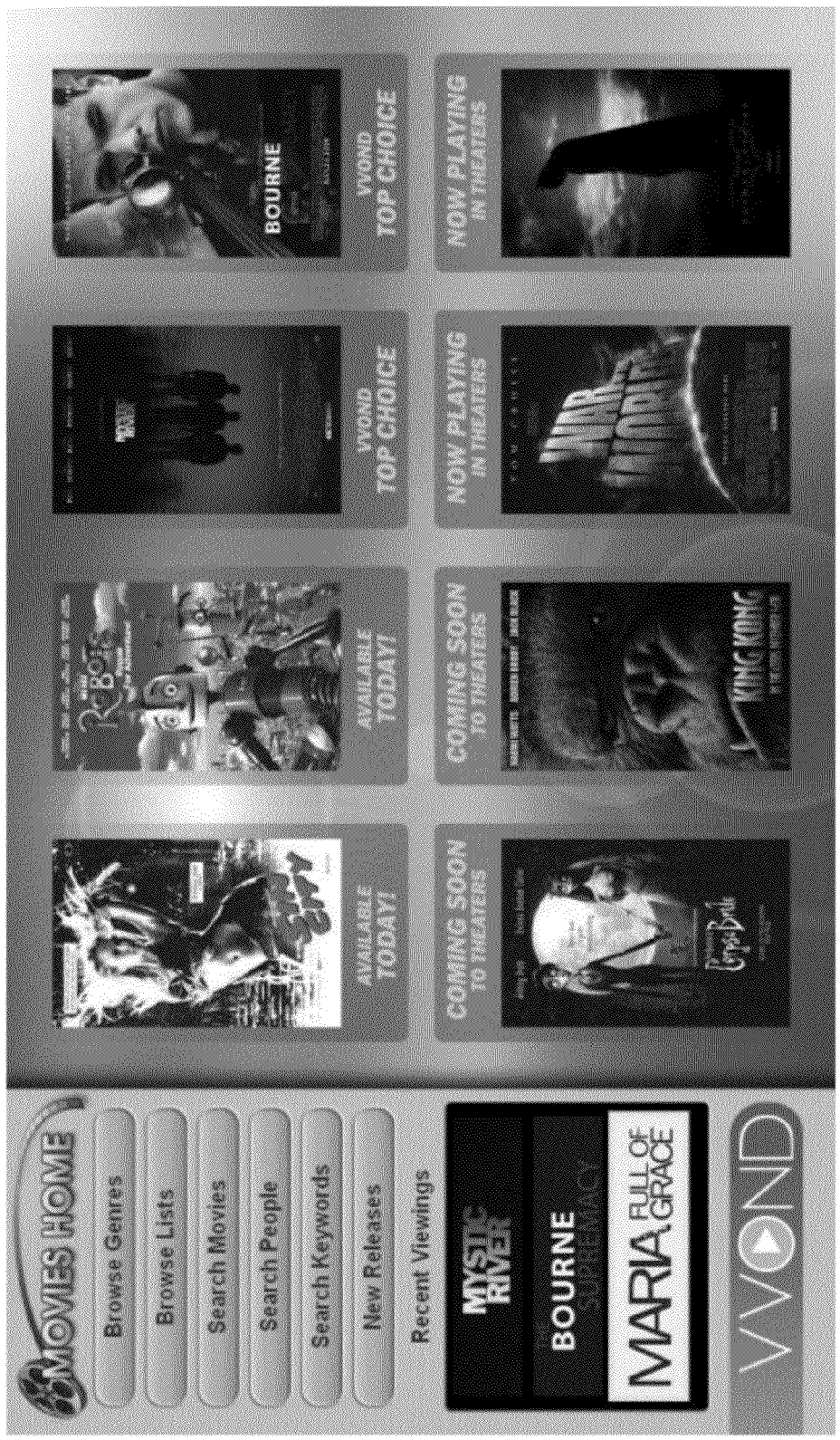
FIG. 5A shows an exemplary display, also referred to herein as a home display, that facilitates a selection of a move title by a user.

Referring now to FIG. 5A, there shows an exemplary display 510, also referred to herein as a home display, that facilitates a selection of a move title by a user. The display 510 includes a functional panel 512 and a notification space 514. The functional panel 512 includes various tools 516 the user may use to manage personalized lists and/or minor accounts if necessary, search a movie and change settings, etc. In addition, the functional panel 512 includes a list of recent movies 518 that the user has viewed.

The notification space 514 is provided to display various promotions. The embodiment as shown in the display 510 shows that there are eight movies being promoted. In another embodiment, the notification space 514 is used to advertise various services and products. These services and products may be highly related to the interests or characteristics of the account owner. When an account is established for the owner, a list of questions may be posed for the owner to answer. The answers from the owner to the questions are assembled and analyzed to determine the interests or characteristics of the owner. For example, some answers indicate that the owner is very much into golfing, the notification space 514 may be configured to display services and products somehow related to golfing. The interests or characteristics of the owner may also be determined from an analysis of the owner's behavior in interacting with the system, together with additional information provided to the system about the behavior of other owners.

According to one embodiment, the notification space 514 provides a platform for businesses to promote or advertise their respective services and products. According to one embodiment, the use of the notification space 514 or the selection of programs to be displayed in the notification space 514 may be determined through an auction process. In others words, a business willing to pay a higher price gets a higher priority to display its service/products in the notification space 514.

As shown in FIG. 5A, the movies being promoted in the notification space 514 are in the form of movie posters. One of the advantages of showing movie posters instead of titles in words is to make a coincident impact on audience as a movie poster is a single visual image representation of a movie. Movie studios or production companies, large or small, promote their movies with movie posters so that the general audience gets to know a movie quickly from a corresponding movie poster. According to one implementation, each of the displayed movie posters in the notification space 514 is embedded with a link. Once one of the displayed movie posters is selected, a full review of the movie is provided.

Figure 5B:
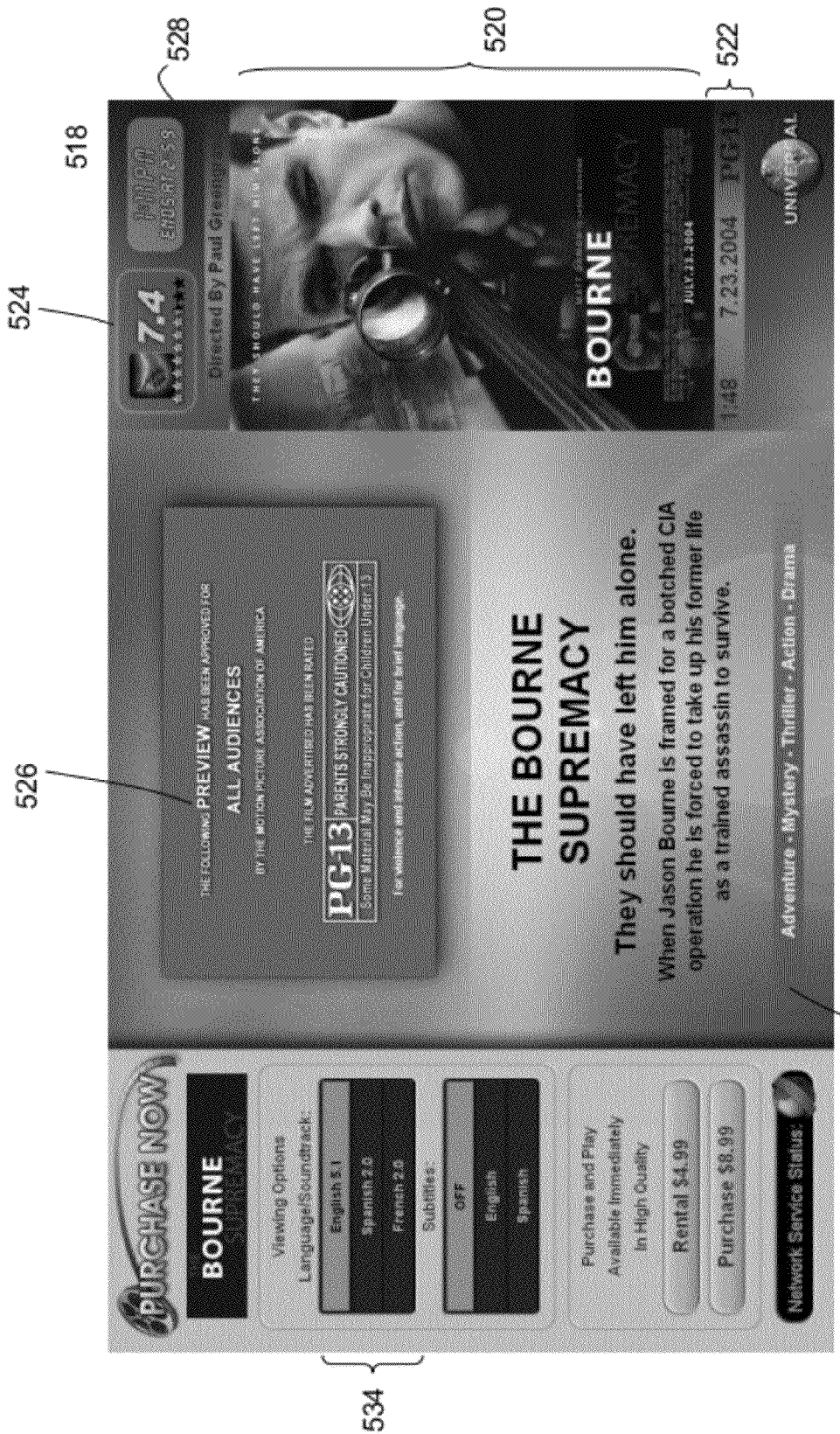
FIG. 5B shows an exemplary full review of a movie that is promoted in the notification space and selected.

FIG. 5B shows an exemplary full review 518 of a movie that is promoted in the notification space 514 and selected. The full review 518 includes a trailer 526 that can be manually or automatically played, a brief description 532 of the movie, a corresponding movie poster 520, and publication information 522 that includes an exact playing time, a publication date and a rating grade. In addition, the full review 518 includes a rating 524 by viewers who have watched the movie and a current time and an ending time 528 if the movie is ordered at the time. One of the features of the full review 518 is that various pieces of information about a movie are integrated in one display so that a user gets to know the movie by one click. Specifically, the full review 518 provides sound track information 534 that indicates how many audio languages are available for the movie. A selection of a particular sound track indicates to the server how to download the distributed data. In one embodiment, the sound track data is not fully downloaded. Instead, given a particular language requirement, only the data that supports the selected language gets downloaded into the ordering device.

Referring back to FIG. 5A, Browse Genres, Browse Lists, Search Movies, Search People, Search Keywords in the functional panel 512 provide respective mechanisms for a user to locate a movie by genres (e.g., drama), lists (e.g., a whole list), movie names (e.g., a specific title), and people (e.g., actor or director). According to one aspect of the present invention, Browse Genres provides an efficient and unique search mechanism for a user to locate a desired movie title.

Figure 6A:
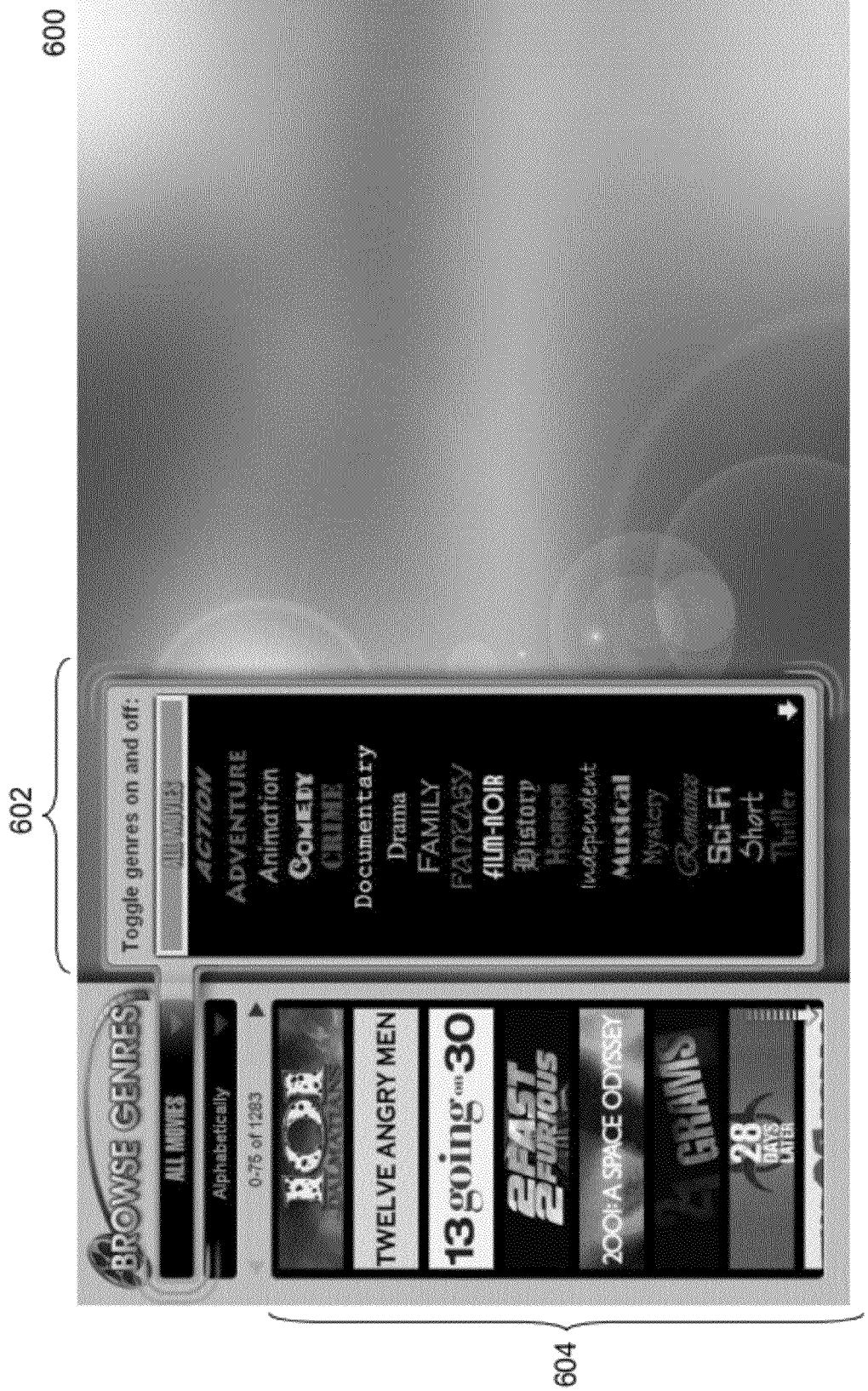
FIG. 6A shows an interface display after the user selects Browse Genres in the functional panel of FIG. 5A.

FIG. 6A shows an interface display 600 after the user selects Browse Genres in the functional panel 512 of FIG. 5A. The display 600 shows a genre table 602 and a list 604 of movie banners organized alphabetically. The list 604 of movie banners may also be organized according to other criteria, e.g., latest releases first or sorted by the system rating of the movie quality. Each of the movie banners shows a title in substantially similar style, font and background as in the corresponding movie poster. It may be appreciated by those skilled in the art that one of the features in the present invention is to create a coincident impact on the audience by using at least part of a movie poster or banner to indicate a movie. In certain aspect, a movie banner is equivalent to a visual "logo" for a movie. A user may browse or scroll the list of movie banners in the list 604. Each of the movie banners in the list 604 is embedded with a link that brings up a full review of the movie when one of the displayed movie banners is selected.

Figure 6B:
FIG. 6B shows that two types "CRIME" and "Thriller" in the genre table are selected.

Typically, the list 604 may include thousands of titles. It is not convenient or efficient to go through the list for a desired title. The genre table 602 provides a mechanism that allows a user to search in a much reduced list specified by types of titles being searched. According to one embodiment, by scrolling a scroll wheel, the user may choose one or more types in the genre table 602, only those titles in the library falling into the specified types are shown in the list 604. FIG. 6B shows that two types "CRIME" and "Thriller" in the genre table 602 are selected. As a result, the movie banners in the list 604 are significantly reduced, the list 604 now includes only those movie banners that are classified as either one of "CRIME" and "Thriller". The selection criteria window 606 shows "CRIME" or "Thriller".

Figure 6C:
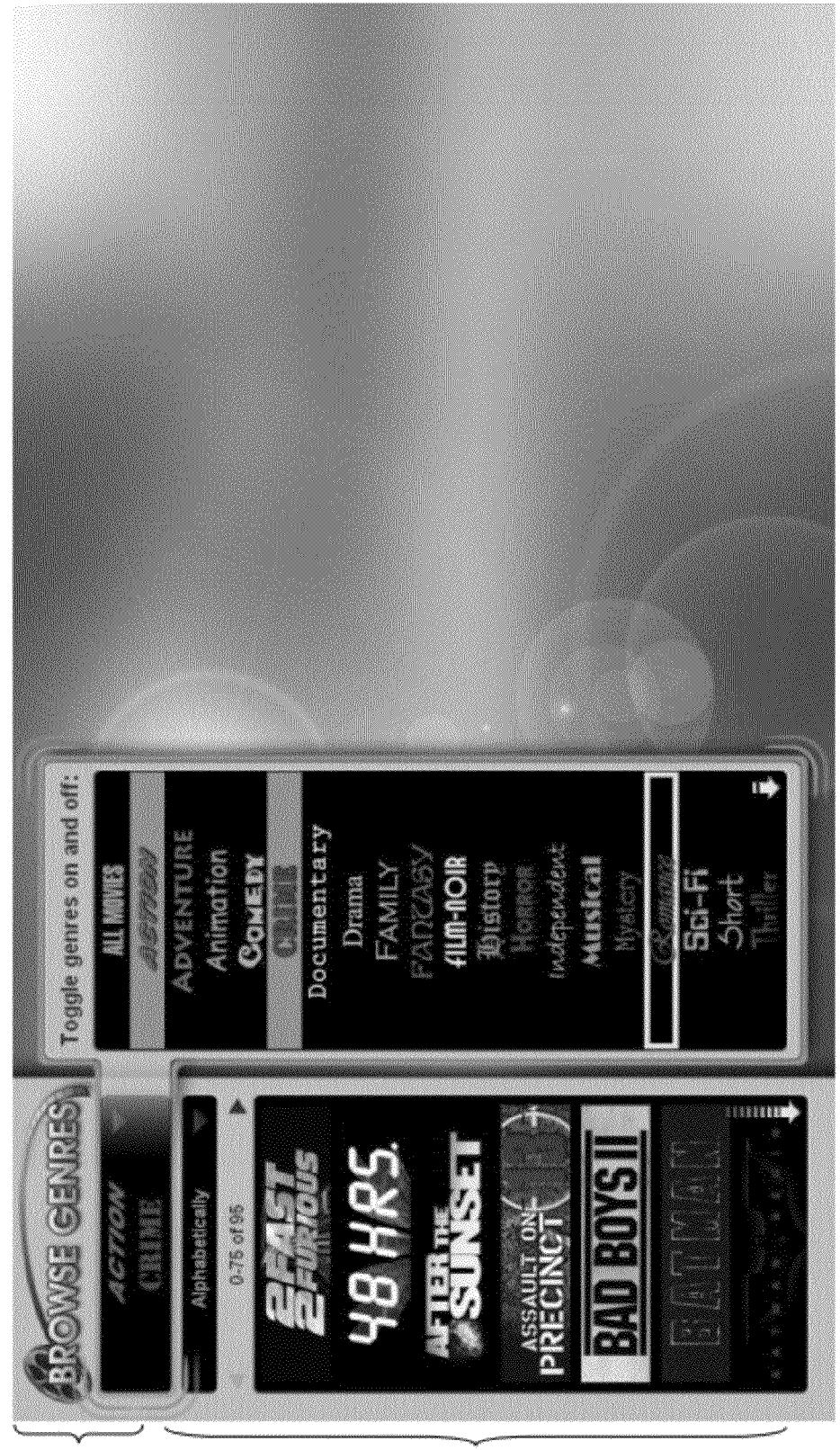
FIG. 6C shows that the selection of "Thriller" has been unselected and a selection "Romance" is being scrolled on for possible selection.

According to one embodiment, by scrolling a scroll wheel and titling the wheel left or right for activation, the selection in the genre table 602 may be unselected or unselected. A new selection may be made after scrolling to a new type and right tilting the scroll wheel. FIG. 6C shows that the selection of "Thriller" has been unselected and a selection "Romance" is being scrolled on. The selection criteria window 606 shows that only "Thriller" is being selected.

Figure 7:
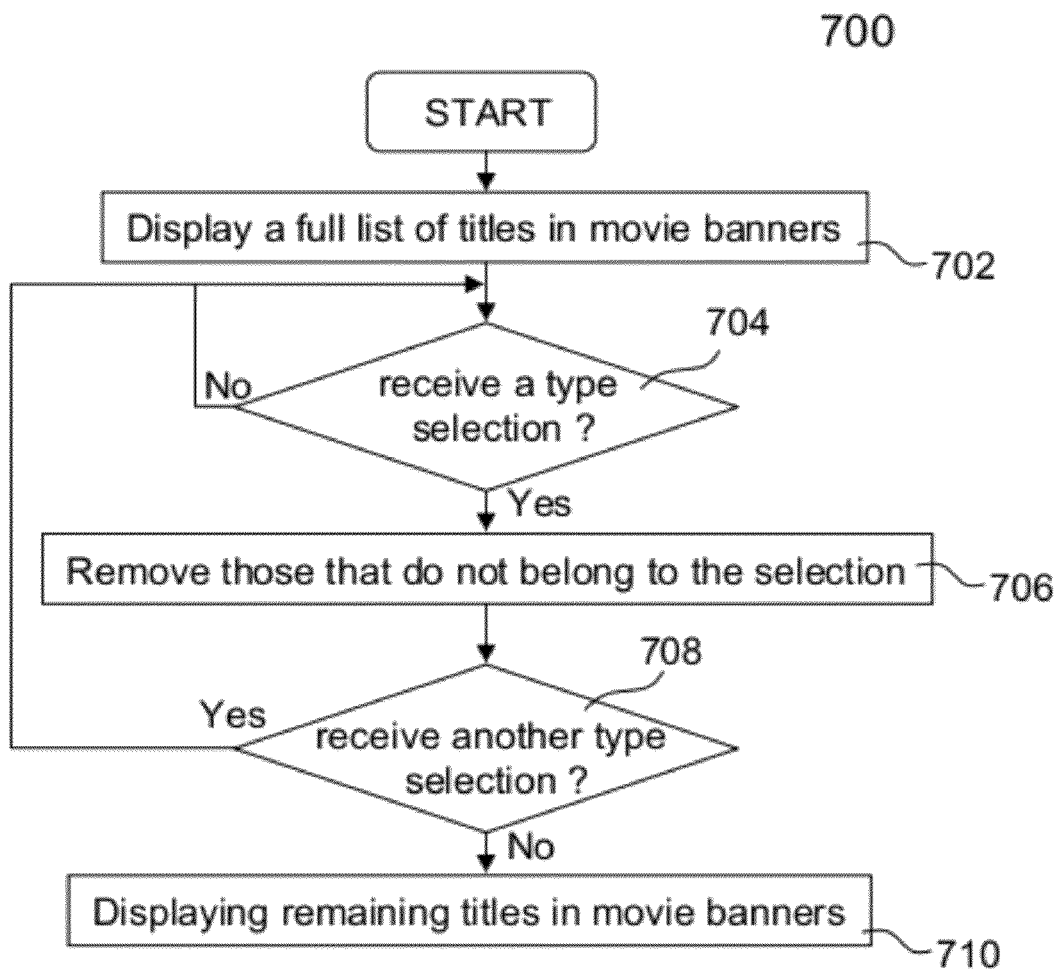
FIG. 7 shows a flowchart or process of providing a graphic user interface that allows a user to narrow down a search list by specifying one or more types.

Referring now to FIG. 7, there shows a flowchart or process 700 of providing a graphic user interface that allows a user to narrow down a search list by specifying one or more types. The process 700, in accordance with one embodiment, may be readily understood in conjunction with FIGS. 5A-6C. Depending on implementation, the process 700 may be implemented in software, hardware or in combination of both as a method or a software module executing in an apparatus.

When a user first logs into a terminal device that executes a software module implementing the process 700, a display screen displays a full list of available titles (e.g., 5000 titles) at 702. An example of such display may be referenced in FIG. 6A. It is understood that it is not convenient to go through the list for a desired item. At 704, the process 700 awaits a selection of a type of movie (e.g., Horror, Action or Drama). When a user enters a selection, the process 700 goes to 706 where the original list is filtered out, essentially, titles that do not fall into the category of the selected type by the user are removed from the list.

At 708, the process 700 checks to see if there is another type selection from the user, if there is one, the process 700 goes back to 704 to receive the selection that will further narrow down the list at 706. It is assumed that the user provides no further selection at 708, the process goes to 710 that shows the reduced list from which the user can readily select a desired title.

One skilled in the art will recognize that elements of the present invention may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. Examples of the computer-readable medium may include, but not be limited to, read-only memory, random-access memory, CD-ROMs, DVDs, magnetic tape, hard disks, optical data-storage devices, or carrier wave. The computer-readable media can also be distributed over network-coupled computer systems so that the computer-readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, FIG. 2A shows a graphic user interface that may be changed to a full display and may become shown only when needed. Accordingly, the scope of the present invention is defined by the appended claims rather than the foregoing description of embodiments.

We claim:

1. A method for displaying movies, the method being performed by one or more processors and comprising:

providing a graphic user interface after a movie title is selected, the graphic user interface including a track bar to reflect how much time data pertaining to the movie title is available for playback, wherein the track bar progressively expands as at least some of the data is being downloaded;

determining whether a current data point is being dragged along the track bar;

tracking a time corresponding to the current data point as the current data point is being dragged;

determining a speed of the current data point being dragged along the track bar;

in response to determining the speed of the current data point being dragged along the track bar, displaying a sequence of images corresponding to the movie title and corresponding to the speed of the current data point being dragged, wherein displaying the sequence of images includes displaying a default image when the speed of the current data point being dragged is greater than a particular speed; and continuing to play back the movie title from the time corresponding to the current data point once the current data point is no longer dragged along the track bar.

2. The method as recited in claim 1, wherein the current data point is expressed in terms of time.

3. The method as recited in claim 2, wherein the some of the data is concurrently downloaded from one or more other devices.

4. The method as recited in claim 3, wherein all of the data must be multiplexed to recover original data sequence to render the playback of the movie title.

5. The method as recited in claim 1, wherein the current data point is superimposed upon the track bar so that the current data point is visually seen relatively with respect to the track bar when the current data point is being dragged along the track bar.

6. The method as recited in claim 5, wherein a time corresponding to the current data point is also displayed.

7. The method as recited in claim 5, wherein a time corresponding to the track bar is also displayed, the time keeps changing accordingly as distributed data pertaining to the movie title is being received.

8. The method as recited in claim 1, further comprising:
locating an image closest to a time corresponding to the current data point when the current data point is no longer dragged; and
wherein said continuing to play back the movie title starting from the current data point comprises continuing to play back the movie title starting from the image.

9. The method as recited in claim 8, wherein the full image is an I-frame.

10. A device for displaying movies, the device comprising:
a memory for storing a software module;
a display screen;
a driver;
a microprocessor, coupled to the memory, executing the software module such that the driver causes the display screen to display a graphic user interface after a movie title is selected, the graphic user interface including a track bar to reflect how much time data pertaining to the movie title is available for playback, wherein the track bar progressively expands as at least some of the data is being downloaded;
wherein the software module is configured to perform operations of:
determining whether a current data point is being dragged along the track bar;
tracking a time corresponding to the current data point as the current data point is being dragged;
determining a speed of the current data point being dragged along the track bar;
in response to determining the speed of the current data point being dragged along the track bar, displaying a sequence of images corresponding to the movie title and corresponding to the speed of the current data point being dragged, wherein displaying the sequence of images includes displaying a default image when the speed of the current data point being dragged is greater than a particular speed; and
continuing to play back the movie title from the time corresponding to the current data point once the current data point is no longer dragged along the track bar.

11. The device as recited in claim 10, wherein the current data point is expressed in terms of time.

12. The device as recited in claim 11, wherein the some of the data is concurrently downloaded from one or more other devices.

13. The device as recited in claim 12, wherein all of the data must be multiplexed to recover original data sequence to render the playback of the movie title.

14. The device as recited in claim 10, wherein the current data point is superimposed upon the track bar so that the current data point is visually seen relatively with respect to the track bar when the current data point is being dragged along the track bar.

15. The device as recited in claim 14, wherein a time corresponding to the current data point is also displayed.

16. The device as recited in claim 14, wherein a time corresponding to the track bar is also displayed, the time keeps changing accordingly as distributed data pertaining to the movie title is being received.

17. The device as recited in claim 10, further comprising:
locating an image closest to a time corresponding to the current data point when the current data point is no longer dragged; and
wherein said continuing to play back the movie title starting from the current data point comprises continuing to play back the movie title starting from the image.

18. The device as recited in claim 17, wherein the full image is an I-frame.

* * * * *